United States Patent
Kim et al.

(10) Patent No.: US 12,109,948 B2
(45) Date of Patent: Oct. 8, 2024

(54) ADAPTER DEVICE FOR VEHICLE

(71) Applicants: HYUNDAI MOTOR COMPANY, Seoul (KR); KIA CORPORATION, Seoul (KR); KIPP GMBH & CO. KG, Sulz (DE)

(72) Inventors: Ji Ah Kim, Seoul (KR); Jin Ho Hwang, Cheonan-si (KR); Ji Seob Park, Incheon (KR); Sascha Fischer, Empfingen (DE); Patrick Staiger, Epfendorf (DE); Adrian Dettling, Horb (DE)

(73) Assignees: HYUNDAI MOTOR COMPANY, Seoul (KR); KIA CORPORATION, Seoul (KR); KIPP GMBH & CO. KG, Sulz (DE)

( * ) Notice: Subject to any disclaimer, the term of this patent is extended or adjusted under 35 U.S.C. 154(b) by 58 days.

(21) Appl. No.: 18/072,007

(22) Filed: Nov. 30, 2022

(65) Prior Publication Data
US 2023/0356667 A1 Nov. 9, 2023

(30) Foreign Application Priority Data

May 9, 2022 (KR) ........................ 10-2022-0056644

(51) Int. Cl.
*B60R 11/00* (2006.01)
(52) U.S. Cl.
CPC ....... *B60R 11/00* (2013.01); *B60R 2011/0028* (2013.01); *B60R 2011/0071* (2013.01); *B60R 2011/008* (2013.01)

(58) Field of Classification Search
CPC ............ B60R 11/00; B60R 2011/0028; B60R 2011/0071; B60R 2011/008
See application file for complete search history.

(56) References Cited

U.S. PATENT DOCUMENTS

| | | | | |
|---|---|---|---|---|
| 2,920,581 | A * | 1/1960 | Cook | ..................... B65G 9/002 104/107 |
| 5,402,979 | A * | 4/1995 | Bellamy | ................. B60R 11/00 182/127 |
| 6,745,813 | B2 * | 6/2004 | Yorgason | .............. E05D 15/063 160/199 |
| 6,758,325 | B2 * | 7/2004 | Greeley | ................. B65G 9/008 198/465.4 |
| 9,643,783 | B2 * | 5/2017 | Fenile | .................. B65G 19/025 |
| 10,414,596 | B2 | 9/2019 | Monti | |
| 2020/0003257 | A1 * | 1/2020 | Neufeld | ................. B65G 54/02 |

FOREIGN PATENT DOCUMENTS

| | | |
|---|---|---|
| JP | 2016-101897 A | 6/2016 |
| KR | 20-0226679 Y1 | 6/2001 |
| KR | 10-0432083 B1 | 5/2004 |
| KR | 10-1528162 B1 | 6/2015 |
| KR | 2021-0059372 A | 5/2021 |

\* cited by examiner

*Primary Examiner* — Anita M King
(74) *Attorney, Agent, or Firm* — MCDONNELL BOEHNEN HULBERT & BERGHOFF LLP

(57) ABSTRACT

An adapter device for a vehicle includes a rail unit installed in the vehicle and defining a moving path, and an adapter unit mounted on the rail unit to move along the moving path, with a connector for mounting various convenience equipment being interchangeably coupled to the adapter unit.

10 Claims, 18 Drawing Sheets

ADAPTER DEVICE FOR VEHICLE

CROSS REFERENCE TO RELATED APPLICATIONS

The present application claims priority to Korean Patent Application No. 10-2022-0056644, filed May 9, 2022, the entire contents of which are incorporated herein for all purposes by this reference.

BACKGROUND

Field

The present disclosure relates to an adapter device for a vehicle. More particularly, the present disclosure relates to an adapter device for a vehicle, in which a moving rail is provided on a headliner of a vehicle interior, and an adapter is installed on the moving rail to enable the replacement and installation of convenience equipment, thus enabling all occupants to effectively utilize the convenience equipment.

Description of the Related Art

Generally, as the design-related industrial market grows and develops day by day, interest in the field of product development considering both practicality and design and the field of interior design based on various industrial design items is increasing.

Particularly, a vehicle is regarded as a transportation means indispensable in a modern society that seeks convenience and speed. Its meaning is not limited to the transportation means, but is growing as a symbol that can reflect one's individuality and life.

Thus, consumers who own personal vehicles are paying a lot of attention to the interior and exterior designs of vehicles to reflect their individuality or to modify vehicles suitable for their use.

On the other hand, in the case of interior materials provided in the interior of the vehicle, functionality and high sensitivity are required. Accordingly, various developments are being attempted in the vehicle seat-related industry, which has a relatively large impact on the sight of a consumer, but there are not many requirements related to the headliner.

However, recently, due to the mass production of a panoramic sunroof, interest in the headliner is increasing. The headliner is used for the purpose of providing not only the function of simply insulating a vehicle roof and blocking or absorbing noise generated from the outside or the inside, but also the function of promoting the convenience of a driver or an occupant.

In recent years, along with improvement in living standards, vehicles equipped with AV systems (Audio Video system) that allow users to watch TV or movies to relieve the boredom of occupants while driving are also being released. The AV system is usually fixedly installed to be positioned on an instrument panel at the front of the vehicle interior between a driver's seat and a front passenger's seat.

However, since the convenience equipment such as room lamps and AV systems is fixedly installed in the vehicle, the position of the convenience equipment may not be adjusted according to the user's convenience. Further, since the AV system is installed at the front position of the vehicle, it is difficult for a passenger sitting in a rear seat to watch the system.

Thus, as described above, for the purpose of promoting the convenience of a driver or a passenger, there is a need to develop a technology that allows the convenience equipment to be installed on the headliner and also allows a passenger sitting in the rear seat to use the convenience equipment.

SUMMARY

Accordingly, the present disclosure has been made keeping in mind the above problems occurring in the related art, and an objective of the present disclosure is to provide an adapter device for a vehicle, in which a moving rail is provided on a headliner of a vehicle interior, an adapter is movably installed along the moving rail, and a connector equipped with convenience equipment is interchangeably mounted on the adapter, thus enabling the installation and replacement of the convenience equipment desired by an occupant, such as a tablet PC, a light, or a fan, and in which an adapter is movably installed on a moving rail, thus causing all occupants to easily utilize convenience equipment.

The present disclosure provides an adapter device for a vehicle, the adapter device including a rail unit installed in the vehicle, and defining a moving path, and an adapter unit mounted on the rail unit to move along the moving path, with a connector for mounting various convenience equipment being interchangeably coupled to the adapter unit.

The adapter unit may include a main body having a coupling hole so that the connector is coupled thereto, a plurality of coupling guide rollers coupled to an upper surface of the main body to be inserted into the rail unit, and guiding movement of the main body along the moving path, a rotary handle connected to the coupling guide roller, and rotating the coupling guide roller to selectively mount or dismount the main body on or from the rail unit, and a button guiding movement of rail fixing members mounted on opposite sides of the main body, and causing the rail fixing members to be selectively drawn into the main body as the buttons are pressed.

When the button is pressed in an initial position where the rail fixing members protrude from the opposite sides of the main body, the rail fixing members may be drawn into the main body, and, as the main body is inserted into the rail unit, pressure may be released from the button to cause the rail fixing members to elastically return to initial positions thereof.

The connector may include a coupling part including an insert member to be inserted into the coupling hole, and an operating handle that selectively separates the insert member from the coupling hole, a connecting part connected to the coupling part to be rotatable as the coupling part is rotated, and extending to a predetermined length, and a holder fixing part coupled to the connecting part, and formed to allow angle adjustment and rotation of a holder for mounting the convenience equipment.

The coupling part may include a ball member formed to protrude through a mounting guide hole formed in an outer circumference of the insert member; and a lift guide provided in the insert member to be movable up and down by elasticity, connected to the operating handle, and moving downward as the operating handle is operated, thus guiding to cause the ball member to selectively enter the guide hole.

The holder may include a support member and pressing members for fixing the convenience equipment.

The pressing members may be formed such that a distance between the facing pressing members is adjustable to correspond to a size of the convenience equipment.

The holder may include a seat member formed to seat the convenience equipment thereon; and a receiving member disposed in a receiving hole provided in the seat member, and taken out from the receiving hole as the convenience equipment is seated on the seat member, thus elastically fixing the convenience equipment.

The adapter unit may include a main body having a coupling hole so that the connector is coupled thereto, a plurality of coupling guide rollers coupled to an upper surface of the main body, and guiding movement of the main body along the moving path while pressing and catching an outer circumference of a protrusion provided in the rail unit, and a button guiding movement of any one of the coupling guide rollers, and increasing a distance between the facing coupling guide rollers, thus releasing the coupling guide rollers from the protrusion and selectively dismounting the main body from the rail unit.

In a pressing state where a distance between the facing coupling guide rollers is larger than a width of the protrusion, pressure may be released from the button, thus pressing the protrusion and thereby mounting the main body on the rail unit.

The protrusion may include a light guide for coupling an indoor light.

The present disclosure is advantageous in that a moving rail is provided on a headliner of a vehicle interior, an adapter is movably installed along the moving rail, and a connector equipped with convenience equipment is interchangeably mounted on the adapter, thus enabling the installation and replacement of the convenience equipment desired by an occupant, such as a tablet PC, a light, or a fan.

Further, the present disclosure is advantageous in that an adapter is movably installed on a moving rail, thus causing all occupants to easily utilize convenience equipment, as the adapter is moved to a central position in a vehicle interior, in a state where a tablet PC is mounted on a connector, for example.

DETAILED DESCRIPTION

Hereinafter, preferred embodiments of the present disclosure will be described in detail with reference to the accompanying drawings.

The above and other objectives, features, and other advantages of the present disclosure will be more clearly understood from the following detailed description when taken conjointly with the accompanying drawings.

However, the embodiment of the present disclosure may be modified in various forms, and the scope of the present disclosure should not be construed as being limited to the following embodiment. This embodiment is provided to make those of ordinary skill in the art more completely understand the present disclosure.

Further, when it is determined that the detailed description of the known art related to the present disclosure may obscure the gist of the present disclosure, the detailed description will be omitted.

Figure 1:
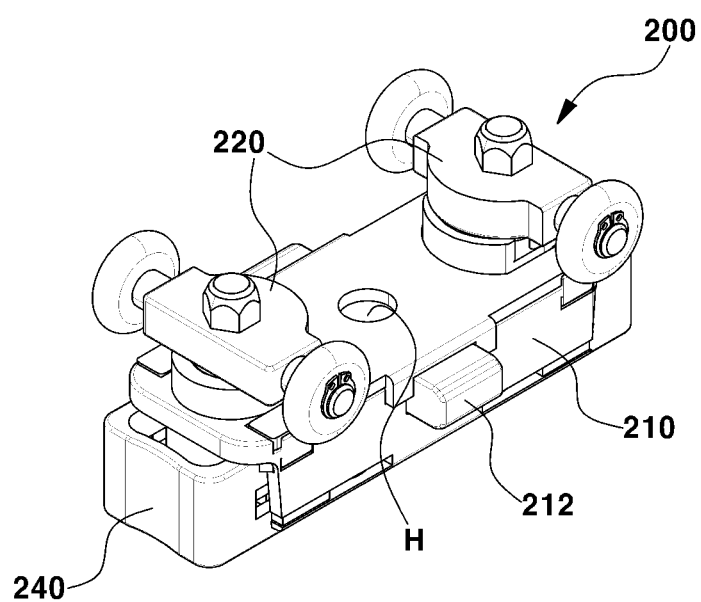
FIG. 1 is a view illustrating an adapter unit of an adapter device for a vehicle according to an embodiment of the present disclosure.
Figure 2:
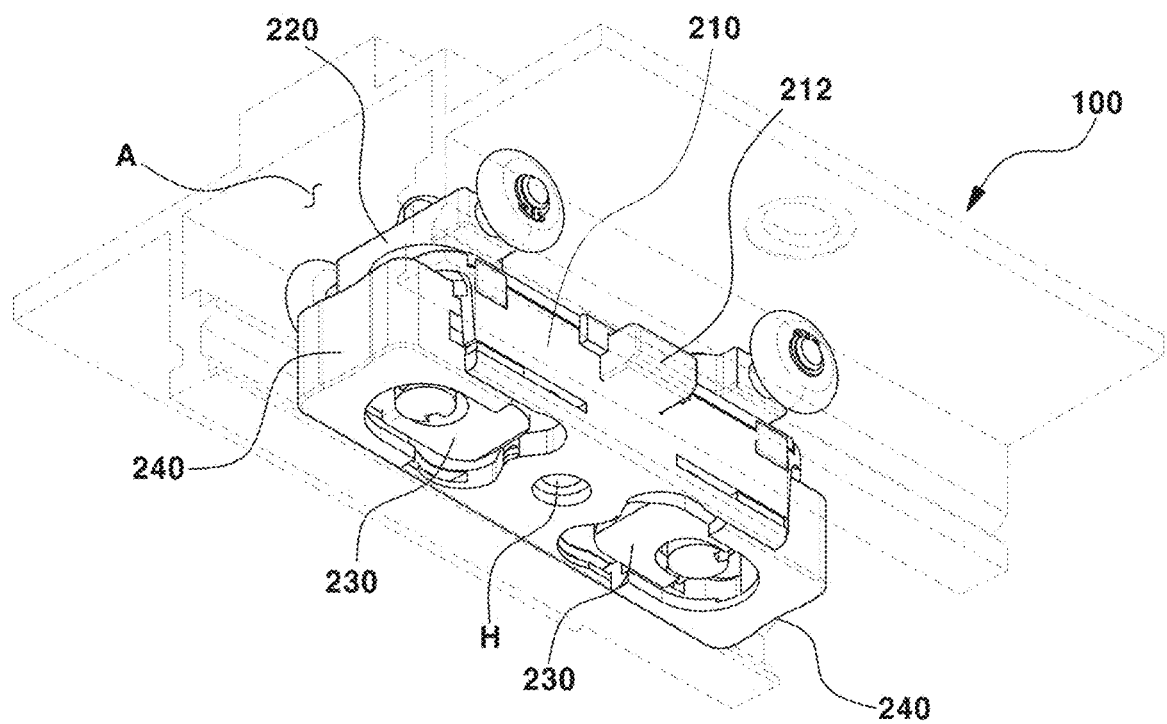
FIGS. 2 and 3 are views illustrating the adapter unit mounted on a rail unit of the adapter device for the vehicle according to an embodiment of the present disclosure.
Figure 3:
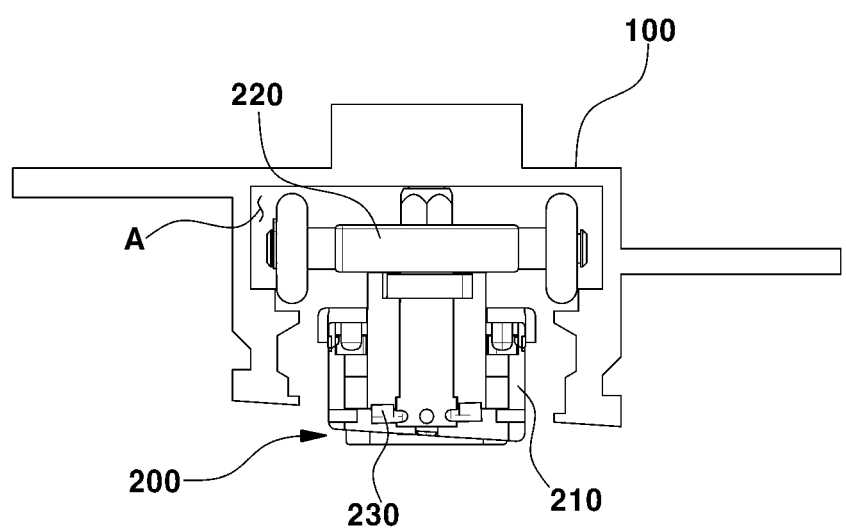
Figure 4:
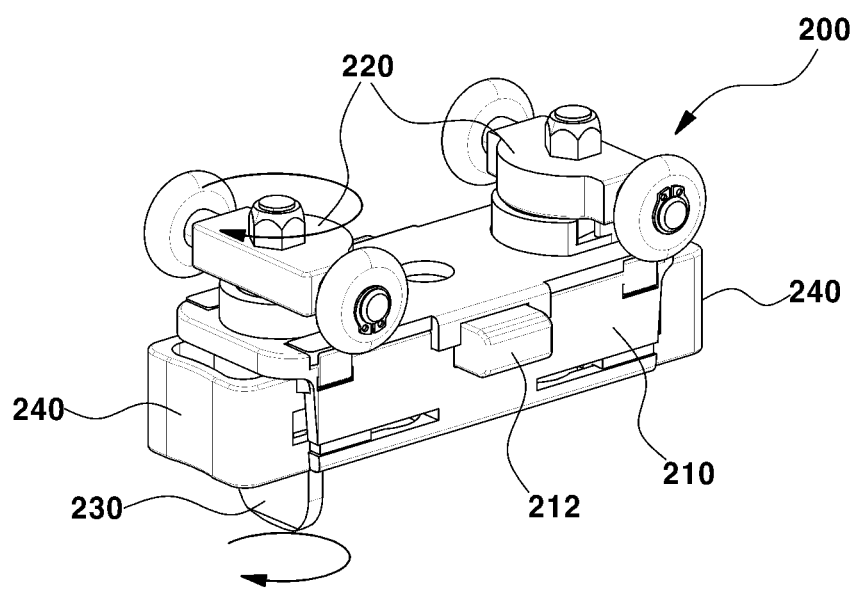
FIG. 4 is a view illustrating the operation of a coupling guide roller of the adapter device for the vehicle according to an embodiment of the present disclosure.

FIG. 1 is a view illustrating an adapter unit of an adapter device for a vehicle according to an embodiment of the present disclosure, FIGS. 2 and 3 are views illustrating the adapter unit mounted on a rail unit of the adapter device for the vehicle according to an embodiment of the present disclosure, and FIG. 4 is a view illustrating the operation of a coupling guide roller of the adapter device for the vehicle according to an embodiment of the present disclosure.

Figure 5:
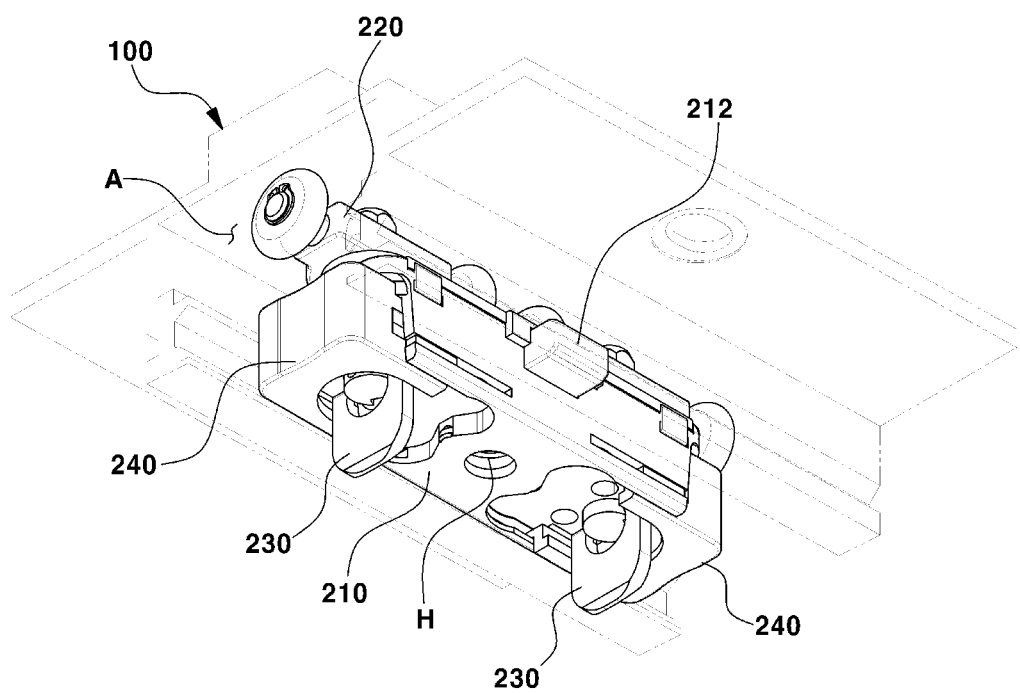
FIGS. 5 and 6 are views illustrating the adapter unit dismounted from the rail unit of the adapter device for the vehicle according to an embodiment of the present disclosure.
Figure 6:
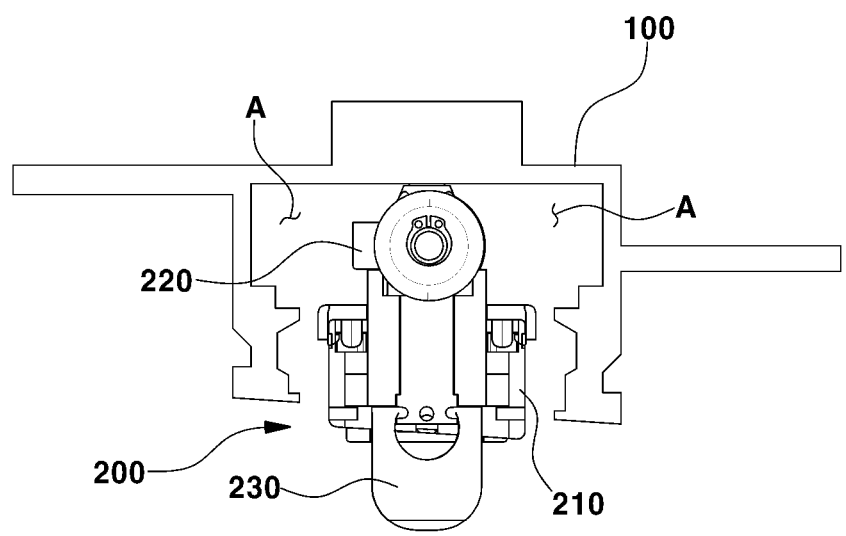
Figure 7:
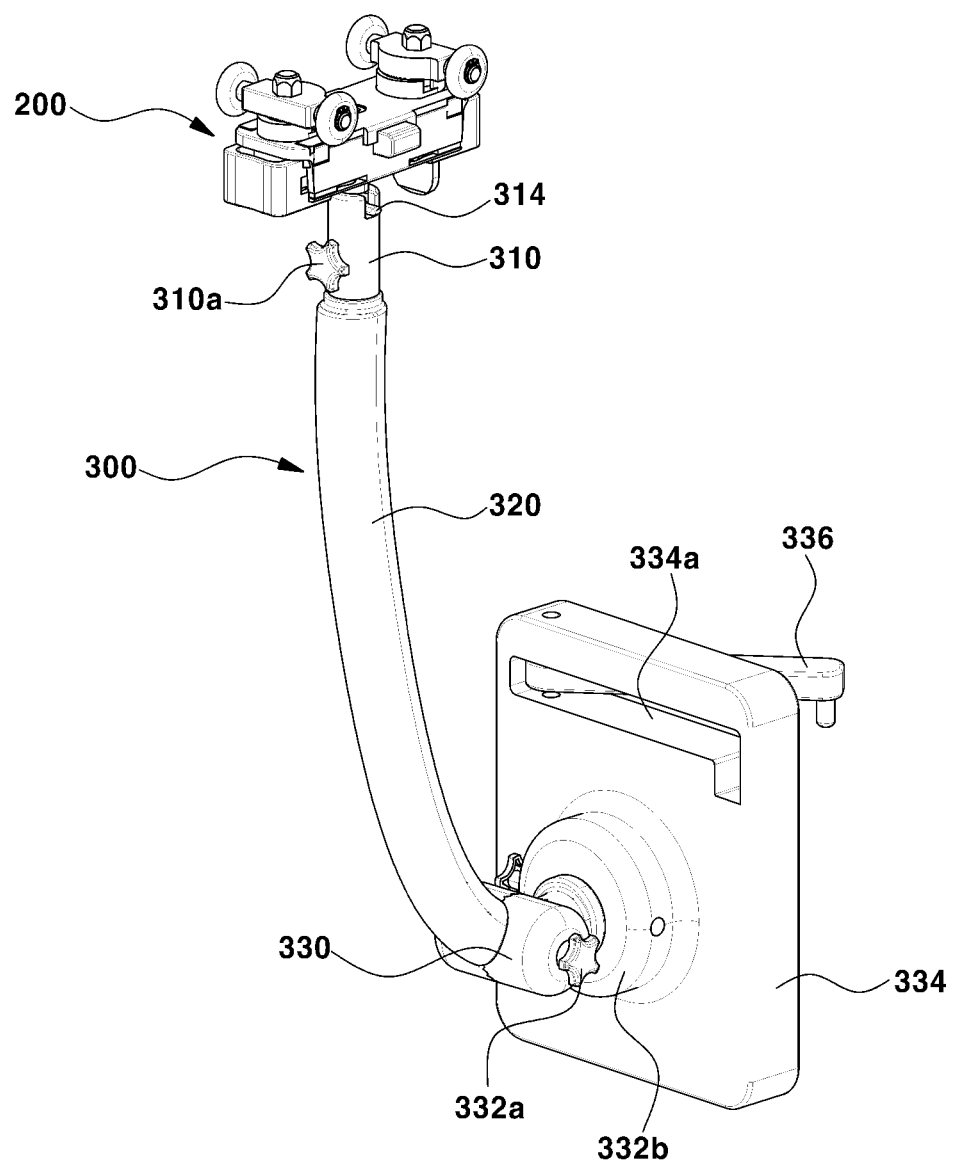
FIG. 7 is a view illustrating a connector of the adapter device for the vehicle according to an embodiment of the present disclosure.
Figure 8:
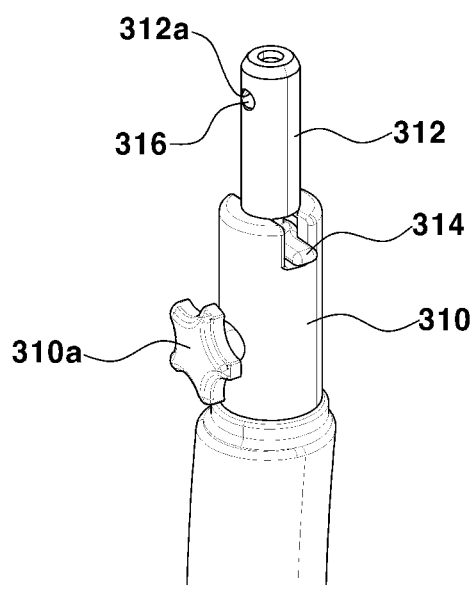
FIG. 8 is a view illustrating a coupling part of the connector of the adapter device for the vehicle according to an embodiment of the present disclosure.

Further, FIGS. 5 and 6 are views illustrating the adapter unit dismounted from the rail unit of the adapter device for the vehicle according to an embodiment of the present disclosure, FIG. 7 is a view illustrating a connector of the adapter device for the vehicle according to an embodiment of the present disclosure, and FIG. 8 is a view illustrating a coupling part of the connector of the adapter device for the vehicle according to an embodiment of the present disclosure.

Figure 9:
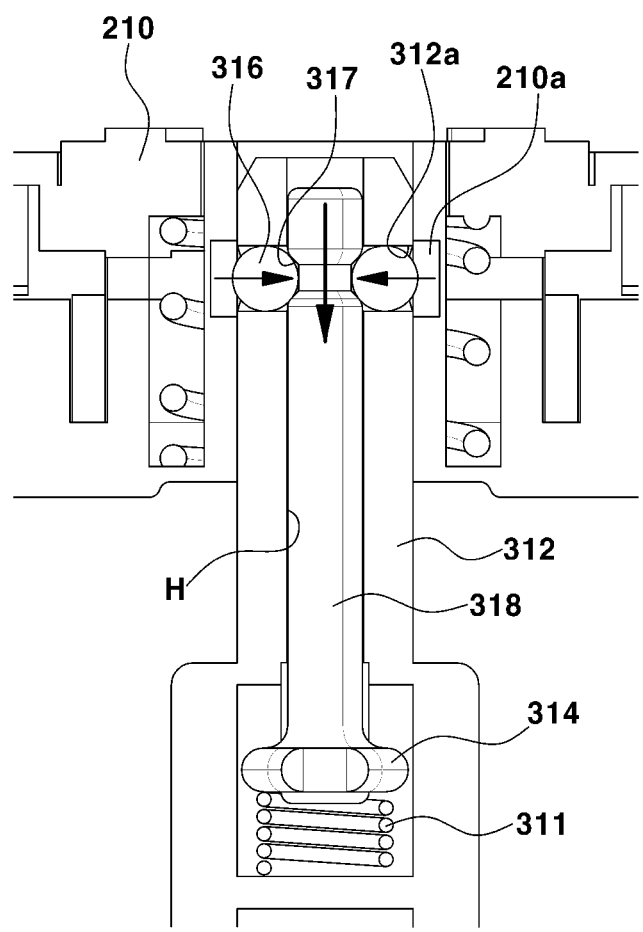
FIG. 9 is a view illustrating the coupling of a main body and the coupling part of the adapter device for the vehicle according to an embodiment of the present disclosure.
Figure 10:
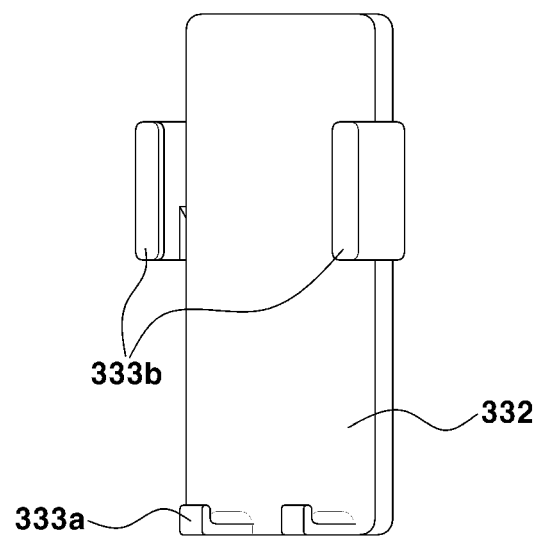
FIG. 10 is a view illustrating a structure of a holder of the adapter device for the vehicle according to an embodiment of the present disclosure.
Figure 11:
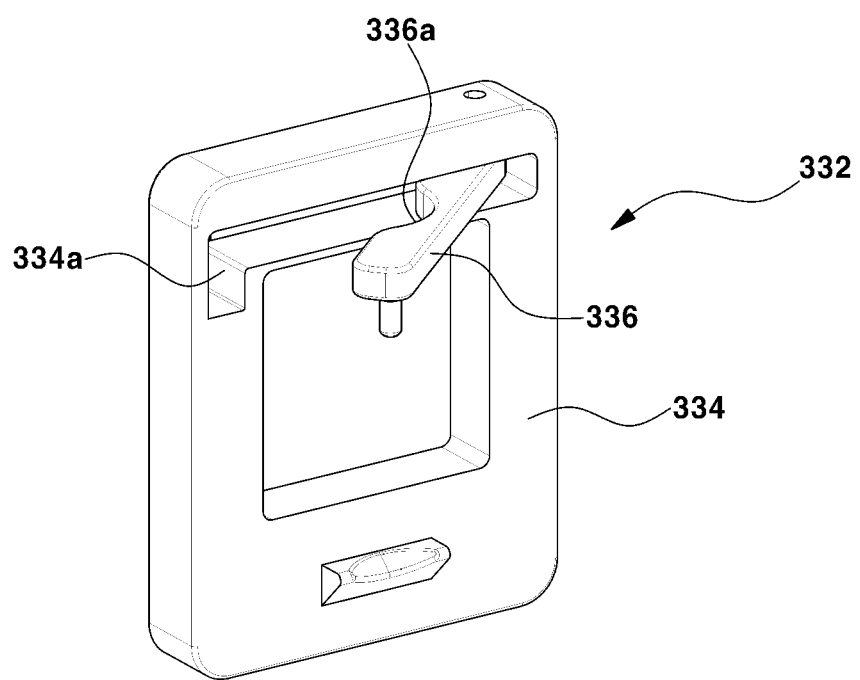
FIG. 11 is a view illustrating another structure of the holder of the adapter device for the vehicle according to an embodiment of the present disclosure.

Furthermore, FIG. 9 is a view illustrating the coupling of a main body and the coupling part of the adapter device for the vehicle according to an embodiment of the present disclosure, FIG. 10 is a view illustrating a structure of a holder of the adapter device for the vehicle according to an embodiment of the present disclosure, and FIG. 11 is a view illustrating another structure of the holder of the adapter device for the vehicle according to an embodiment of the present disclosure.

As shown in FIGS. 1 and 2, the adapter device for the vehicle according to this embodiment includes a rail unit 100 and an adapter unit 200.

First, the rail unit 100 is installed in a headliner in a vehicle interior, defines a mounting area A for mounting the adapter unit 200, and provides a predetermined moving path.

Further, the rail unit 100 is formed in a predetermined size along the edge of the headliner to cover all of seats provided in the vehicle interior. Thus, the adapter unit 200 installed in the mounting area A may move while circulating along the moving path.

The adapter unit 200 is mounted on the rail unit 100 to move along the moving path by the rolling of rollers. A connector 300 for mounting various convenience equipment, e.g. a mini-beam projector, a personal broadcasting microphone, a mini-light, a fan, a tablet PC, etc. is formed to be interchangeably coupled to the adapter unit 200.

A plurality of adapter units 200 may be mounted on the rail unit 100. Thus, by moving a desired number of adapter units 200 in the moving path, convenience equipment of a relatively large size may be mounted using the plurality of adapter units 200, thus allowing the convenience equipment to be stably used.

Such an adapter unit 200 includes a main body 210, a coupling guide roller 220, a rotary handle 230, and a button 240.

The main body 210 has a predetermined size to be gripped by a user, and is formed to be exposed to an outside on the moving path.

Further, the main body 210 has in a central portion thereof a coupling hole H so that the above-mentioned connector 300 is coupled thereto.

A pair of coupling guide rollers 220 is coupled to an upper surface of the main body 210. As the coupling guide rollers are inserted and caught in the mounting area A of the rail unit 100 as shown in FIG. 3, the coupling guide rollers guide the movement of the main body 210 along the moving path.

As shown in FIG. 4, the coupling guide roller 220 may be rotated in opposite directions while being coupled to the upper surface of the main body 210.

To this end, the rotary handle 230 may selectively protrude from a lower surface of the main body 210, thus enabling a user to easily grip the handle.

That is, the rotary handle 230 is connected to the coupling guide roller 220 in the main body 210. Thus, when the rotary handle is rotated by a user, the coupling guide roller 220 is also rotated, so the main body 220 is selectively mounted on or dismounted from the mounting area A of the rail unit 100.

A process for dismounting the main body 210 from the rail unit 100 is as follows.

First, when the pair of rotary handles 230 are pulled out from the lower surface of the main body 210 to protrude therefrom and then are rotated in the same direction, as shown in FIG. 5, the coupling guide roller 220 connected to the rotary handle 230 is also rotated. Thus, as shown in FIG. 6, the coupling guide roller 22 is released from the interior of the mounting area A. Thereby, the main body may be dismounted from the rail unit 100.

The buttons 240 guide the movement of rail fixing members 212 mounted on opposite sides of the main body 210. As the buttons are pressed, the rail fixing members 212 are selectively drawn into the main body 210.

In other words, in an initial position, the rail fixing members 212 protrude from the opposite sides of the main body 210. The rail fixing members are secured at the initial position by elasticity. If each button 240 is pressed toward the interior of the main body 210 (see FIGS. 1 and 4), the rail fixing member 212 is temporarily drawn into the main body 210, thus preventing interference from occurring when the main body 210 is mounted on the rail unit 100.

When pressure is released from the button 240 in a state where the main body 210 is located in the rail unit 100, the rail fixing member 212 elastically returns to its initial position to be caught in the rail unit 100, thus preventing the coupling guide roller 220 and the main body 210 from being removed from the rail unit 100.

Meanwhile, the connector 300 serves to guide the mounting of various convenience equipment. As shown in FIG. 7, the connector 300 includes a coupling part 310, a connecting part 320, and a holder fixing part 330.

The coupling part 310 is provided with an insert member 312 to be inserted into the coupling hole H of the main body 210.

The coupling part 310 is provided to be rotatable in a state where the insert member 312 is inserted into the coupling hole H, and a fixing piece 310a protrudes from the coupling part. Thus, if the fixing piece 310a is rotated in a fastening direction, it presses the interior to fix the rotated position.

Furthermore, the coupling part 310 may be provided with an operating handle 314 to selectively separate the insert member 312 from the coupling hole H.

The coupling part 310 is further provided with a ball member 316 and a lift guide 318.

As shown in FIG. 9, such a ball member 316 is formed to selectively protrude through each of a pair of mounting guide holes 312a formed in an outer circumference of the insert member 312.

If the insert member 312 is inserted into the coupling hole H, a protruding end of the ball member 316 is inserted and caught in an insert hole 210a formed in the main body 210, thus fixing the coupling part 310.

The lift guide 318 is provided in the insert member 312 to be movable up and down by the elasticity of the elastic member 311, and is connected to the operating handle 314 disposed outside the insert member 312.

Thus, as shown in FIG. 8, when the operating handle 314 is operated to perform a downward movement, the lift guide 318 is also moved down in the insert member 312. In the initial state, the ball member 316 protrudes out from the mounting guide hole 312a. As the lift guide 318 moves down, the ball member 316 is moved into a recess 317 by elasticity and then is drawn into the insert member 312 (see a direction shown by the arrow of FIG. 9). Consequently, the ball member is released from the insert hole 210a, so the insert member 312 is released from the coupling hole H, and thereby the coupling part 310 may be separated from the main body 210.

Further, the connecting part 320 is connected to the coupling part 310 to be rotatable as the coupling part 310 is rotated, and extends to a predetermined length (see FIG. 7).

The connecting part 320 may be replaced from the coupling part 310. Thus, any one connecting part 320 may be selected as desired among a plurality of connecting parts 320 having various lengths, and then be coupled to the coupling part 310.

In addition, the connecting part 320 may be formed in multiple stages. Thus, the connecting part 320 selectively extends to be increased or reduced in length as desired, so the convenience equipment may be located at a desired height, when using the convenience equipment.

Further, the holder fixing part 330 is coupled to the connecting part 320, and is formed to allow the angle adjustment and rotation of the holder 332 for mounting the convenience equipment (see FIG. 7).

That is, because the holder fixing part 330 is connected to the holder 332 via a rotating shaft 332a, an angle may be adjusted in a vertical direction by the rotating shaft 332a oriented in a horizontal direction.

Further, because a connecting member 332b coupled to a rear surface of the holder 332 is perpendicularly coupled to the rotating shaft 332a, the holder fixing part 330 may be rotated leftward or rightward (see the arrow shown by FIG. 7).

As shown in FIG. 10, the holder 332 is provided with a support member 333a and a pressing member 333b to fix the convenience equipment. A pair of pressing members 333b is provided, so a distance between the facing pressing members may be adjusted to correspond to the size of each of the various convenience equipment.

The above-described structure of the holder 332 is merely illustrative but is not restrictive. The holder may be provided with a seat member 334 and a receiving member 336.

To be more specific, the seat member 334 is formed in a predetermined area to seat convenience equipment thereon. The receiving member 336 is disposed in a receiving hole 334a provided in the seat member 334, and is taken out from the receiving hole 334a as the convenience equipment is seated on the seat member 334, thus elastically fixing the seated convenience equipment.

In other words, when the receiving member 336 is accommodated in the receiving hole 334a, a position thereof may be fixed via an elastic member (not shown). Thus, when a side of the receiving member which is not fixed is taken out from the receiving hole 334a, this may easily fix the convenience equipment seated between the seat member 334 and the receiving member 336 by an elastic restoring force.

Such a receiving member 336 is provided with a support groove 336a. The convenience equipment may be effectively fixed by pressing the convenience equipment through the receiving member 336 while a circular support guide (not shown) that is commonly applied to the various convenience equipment is located in the support groove 336a.

Figure 12:
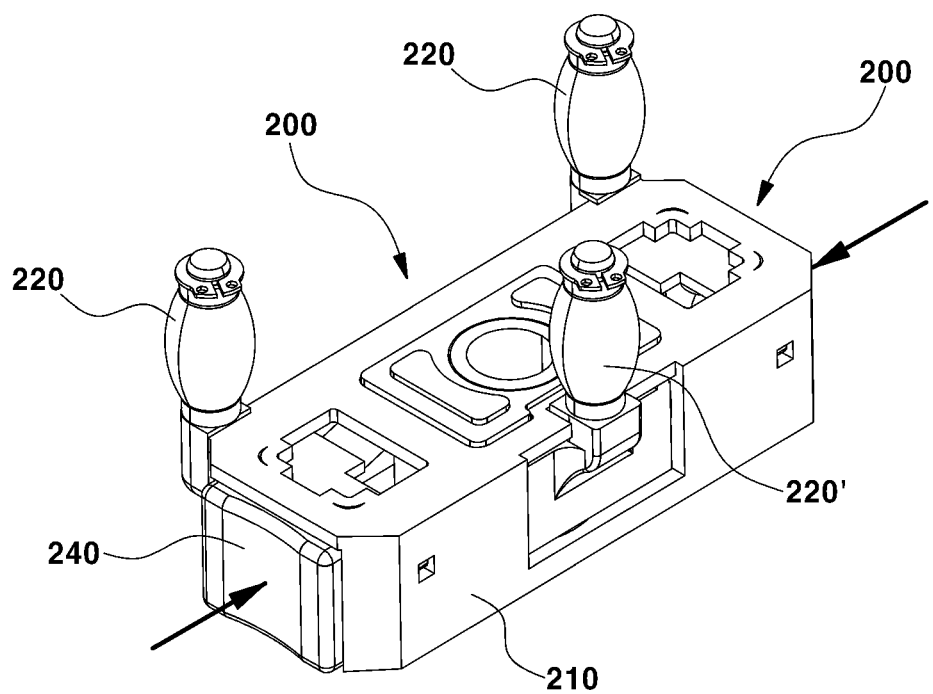
FIG. 12 is a view illustrating an adapter unit of an adapter device for a vehicle according to another embodiment of the present disclosure.
Figure 13:
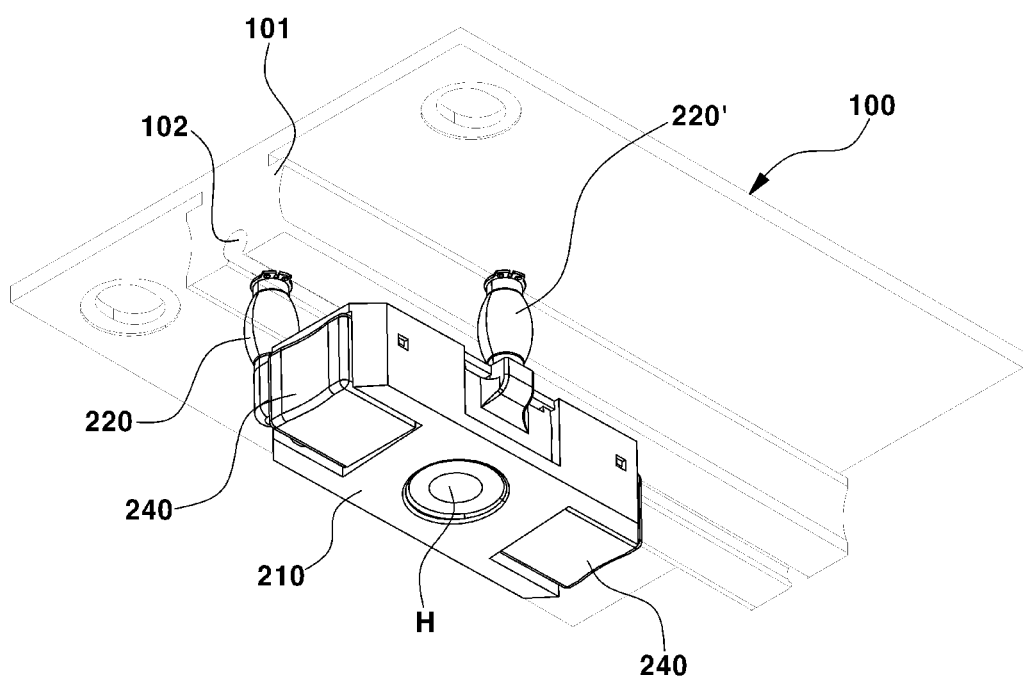
FIGS. 13 and 14 are views illustrating the adapter unit mounted on a rail unit of the adapter device for the vehicle according to another embodiment of the present disclosure.
Figure 14:
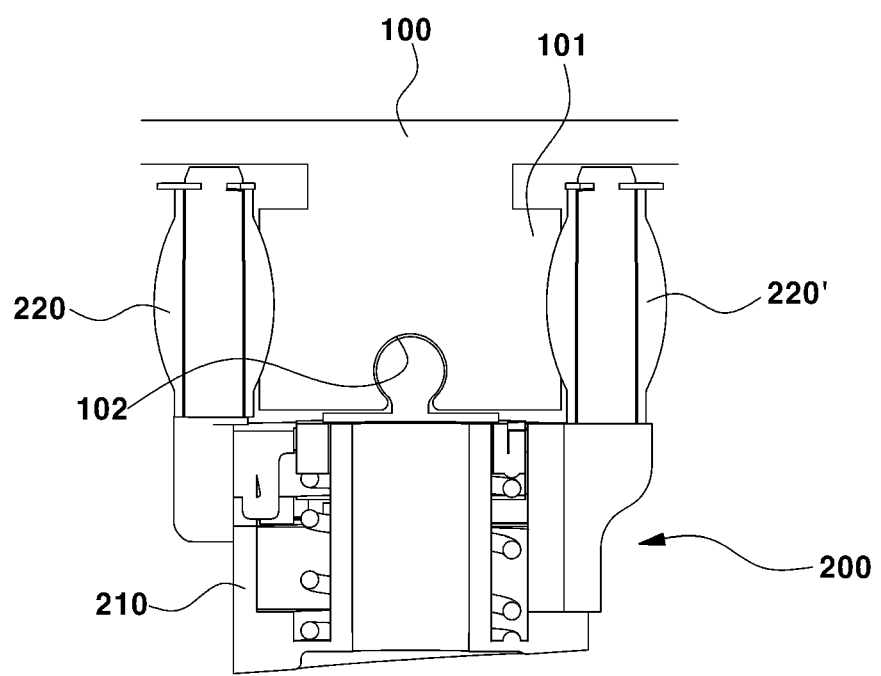

Hereinafter, FIG. 12 is a view illustrating an adapter unit of an adapter device for a vehicle according to another embodiment of the present disclosure, and FIGS. 13 and 14 are views illustrating the adapter unit mounted on a rail unit of the adapter device for the vehicle according to another embodiment of the present disclosure.

Figure 15:
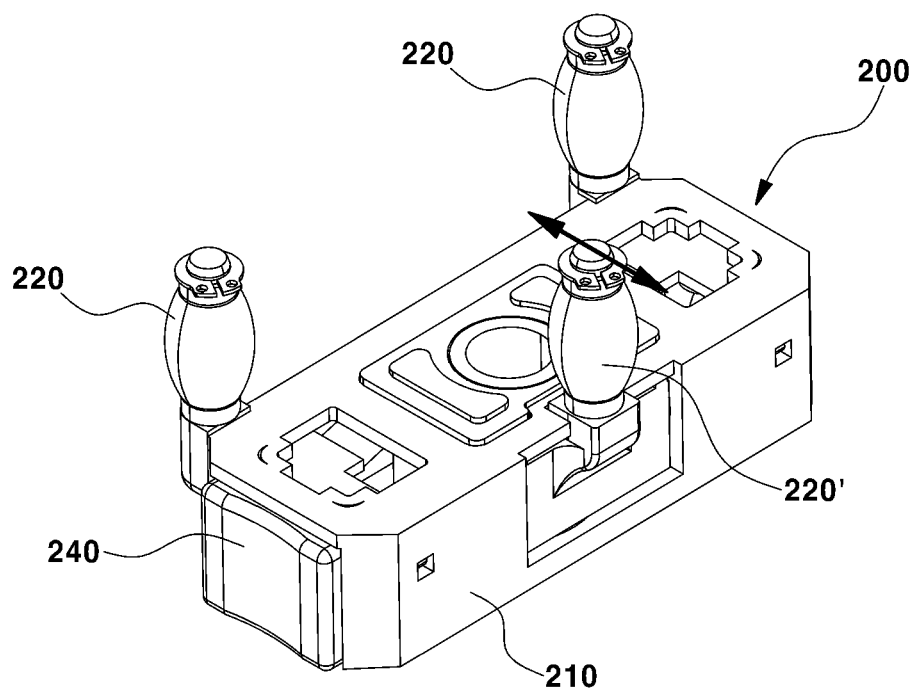
FIG. 15 is a view illustrating the operation of a coupling guide roller of the adapter device for the vehicle according to another embodiment of the present disclosure.
Figure 16:
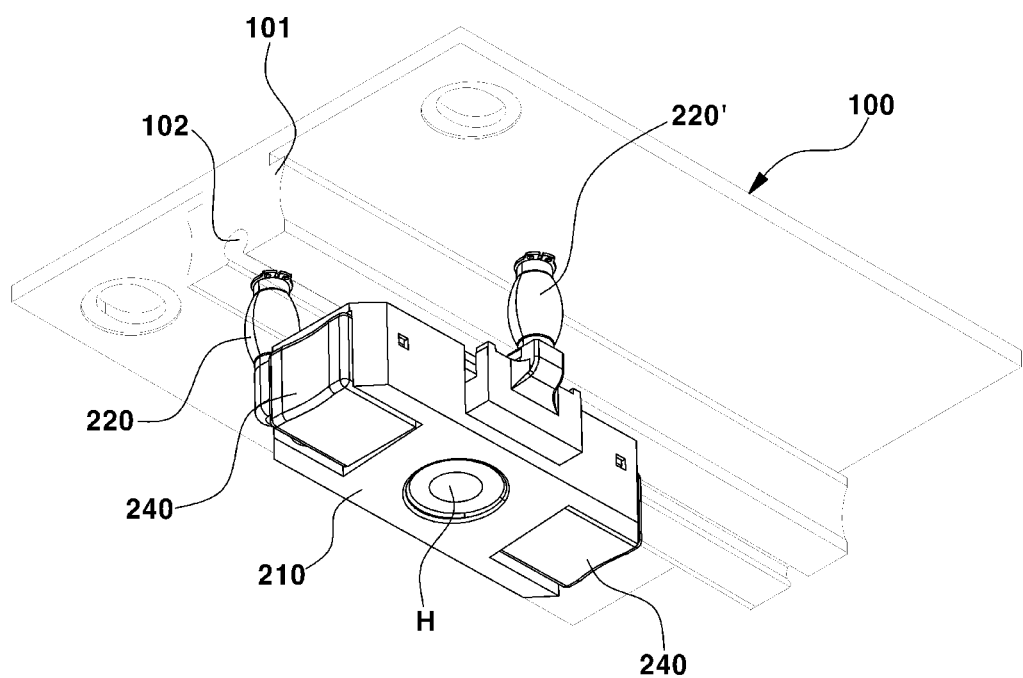
FIGS. 16 and 17 are views illustrating the adapter unit dismounted from the rail unit of the adapter device for the vehicle according to another embodiment of the present disclosure.
Figure 17:
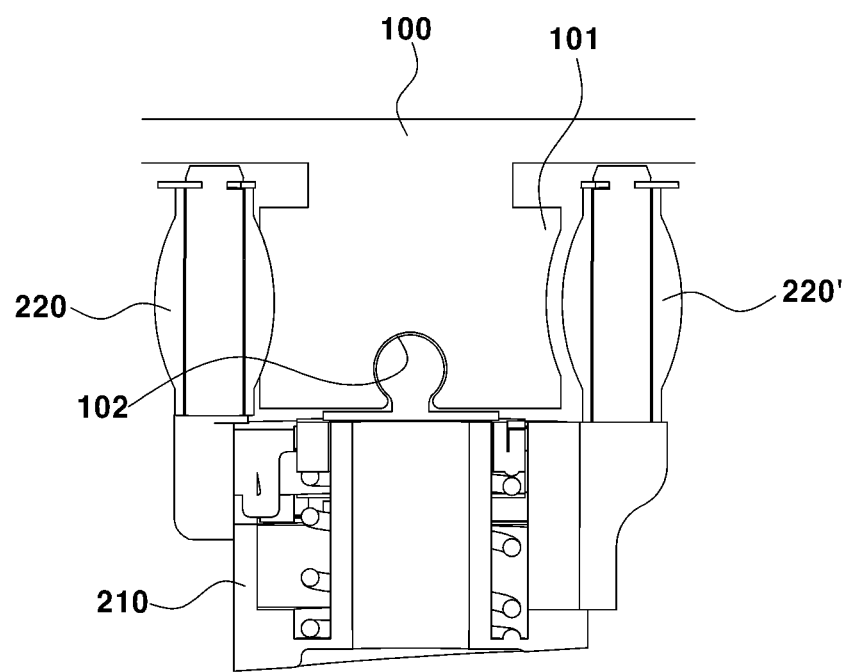
Figure 18:
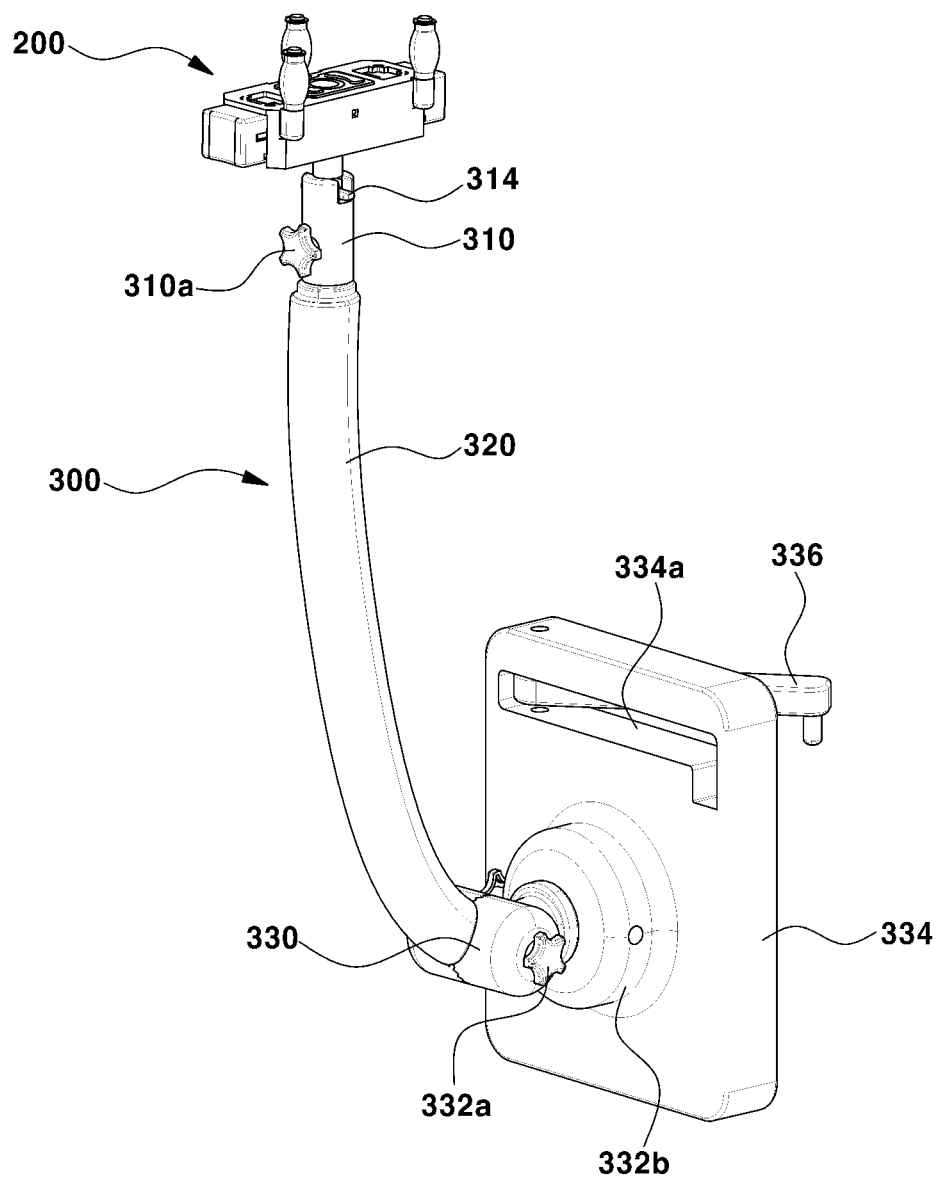
FIG. 18 is a view illustrating a connector of the adapter device for the vehicle according to another embodiment of the present disclosure.

Further, FIG. 15 is a view illustrating the operation of a coupling guide roller of the adapter device for the vehicle according to another embodiment of the present disclosure, FIGS. 16 and 17 are views illustrating the adapter unit dismounted from the rail unit of the adapter device for the vehicle according to another embodiment of the present disclosure, and FIG. 18 is a view illustrating a connector of the adapter device for the vehicle according to another embodiment of the present disclosure.

As shown in FIGS. 12 to 14, the adapter device for the vehicle according to this embodiment includes a rail unit 100 and an adapter unit 200.

First, the rail unit 100 is installed in a headliner in a vehicle interior, and provides a predetermined moving path.

Further, the rail unit 100 is formed in a predetermined size along the edge of the headliner to cover all of seats provided in the vehicle interior. Thus, the adapter unit 200 installed in the rail unit may move while circulating along the moving path.

Further, a protrusion 101 may be formed on a central portion of the rail unit 100 to protrude therefrom, a light guide 102 to which an indoor light is coupled may be formed on a central portion of the protrusion 101, and the adapter unit 200 may be mounted on the protrusion 101.

Meanwhile, the adapter unit 200 is mounted on the rail unit 100 to move along the moving path. A connector 300 for mounting various convenience equipment, e.g. a mini-beam projector, a personal broadcasting microphone, a mini-light, a fan, a tablet PC, etc. is formed to be interchangeably coupled to the adapter unit 200.

A plurality of adapter units 200 may be mounted on the rail unit 100. Thus, by moving a desired number of adapter units 200 in the moving path, convenience equipment of a relatively large size may be mounted using the plurality of adapter units 200, thus allowing the convenience equipment to be stably used.

Such an adapter unit 200 includes a main body 210, a coupling guide roller 220, and a button 240.

Since the structure and operation of the main body 210 remain the same as the above-described embodiment, a detailed description thereof will be omitted herein.

A plurality of coupling guide rollers 220 may be coupled to an upper surface of the main body 210, in other words, a pair of coupling guide rollers may be coupled to one side of the main body, and another coupling guide roller may be coupled to the other side. An outer circumference of the protrusion 101 is pressed and caught by the facing coupling guide rollers 220 and 220'.

That is, the coupling guide rollers 220 are formed such that a distance between the coupling guide rollers 220 and 220' which are arranged to face each other corresponds to the width of the protrusion 101. Thereby, the coupling guide rollers guide the movement of the main body 210 along the moving path using the rolling of the rollers in a state where pressing and fixing both sides of the protrusion 101.

The button 240 is formed to protrude from the main body 210. As the button is pressed by a user, the button guides the movement of any one coupling guide roller 220' of the coupling guide rollers 220.

In more detail, when the button 240 is pressed, the coupling guide roller 220' protrudes out from the main body 210, so the facing coupling guide rollers 220 and 220' are spaced apart from each other. Thus, the main body 210 may be selectively mounted on or dismounted from the protrusion 101 of the rail unit 100.

A process for dismounting the main body 210 from the protrusion 101 of the rail unit 100 is as follows.

First, when the button 240 is pressed in a state where the main body 210 is mounted on the protrusion 101, as shown in FIG. 15, one coupling guide roller 220' moves to protrude from the main body 210. Thus, as shown in FIG. 16, since the coupling guide roller 220 is released from the protrusion 101, the main body may be dismounted from the rail unit 100.

Specifically, in the initial position of the adapter unit 200, the buttons 240 protrude from both ends of the main body 210, and the coupling guide roller 220' is drawn into the main body 210. The initial position of each component is fixed by elasticity. At this time, if each button 240 is pressed toward the inside of the main body 210 (see FIG. 12), the coupling guide roller 220' temporarily protrudes out from the main body 210 (see FIG. 16)). Thus, as the coupling guide rollers 220 and 220' are released from the protrusion 101, as shown in FIG. 17, the adapter unit 200 may be dismounted from the rail unit 100.

When it is required to mount the adapter unit 200 on the rail unit 100, the above process is performed in a reverse order. That is, after the coupling guide rollers 220 and 220' move apart from each other such that a distance therebetween is larger than the width of the protrusion 101 by pressing the button 240, pressure is released from the button 240, and the coupling guide roller 220' returns to an initial position thereof in the rail unit 100 to press the protrusion 101, thus allowing the adapter unit to be mounted on the rail unit again.

The connector 300 according to this embodiment serves to guide the mounting of various convenience equipment. As shown in FIG. 18, such a connector 300 is provided with a coupling part 310, a connecting part 320, and a holder fixing part 330.

Since the configuration, operation, and effect of the connector 300 remain the same as the connector 300 of the embodiment described above with reference to FIGS. 7 to 11, and the holder 332 coupled to the connector 300 also remains the same as the above-described embodiment, a detailed description thereof will be omitted herein.

As described above, the present disclosure provides an adapter device for a vehicle, in which a moving rail is provided on a headliner of a vehicle interior, an adapter is movably installed along the moving rail, and a connector equipped with convenience equipment is interchangeably mounted on the adapter, thus enabling the installation and replacement of the convenience equipment desired by an occupant, such as a tablet PC, a light, or a fan.

Further, the present disclosure provides an adapter device for a vehicle, in which an adapter is movably installed on a moving rail, thus causing all occupants to easily utilize convenience equipment, as the adapter is moved to a central position in a vehicle interior, in a state where a tablet PC is mounted on a connector, for example.

Although the present disclosure was described with reference to specific embodiments shown in the drawings, it is apparent to those skilled in the art that the present disclosure may be changed and modified in various ways without departing from the scope of the present disclosure, which is described in the following claims.

The invention claimed is:

1. An adapter device for a vehicle, the adapter device comprising:
    a rail unit installed in the vehicle, and defining a moving path; and
    an adapter unit mounted on the rail unit, the adapter unit being configured to move along the moving path, a connector being configured to mount equipment to the adapter unit;
    wherein the adapter unit comprises:
        a main body having a coupling hole configured to receive the connector;
        a plurality of coupling guide rollers coupled to an upper surface of the main body and configured to be inserted into the rail unit, wherein the plurality of coupling guide rollers are configured to guide movement of the main body along the moving path;
        a rotary handle connected to the coupling guide roller, and configured to rotate the coupling guide roller to mount or dismount the main body on or from the rail unit; and
        a plurality of buttons configured to guide movement of rail fixing members mounted on opposite sides of the main body, the plurality of buttons being configured to cause the rail fixing members to be drawn into the main body as the plurality of buttons are pressed.

2. The adapter device of claim 1, wherein, when the plurality of buttons are pressed in an initial position where the rail fixing members protrude from the opposite sides of the main body, the rail fixing members are drawn into the main body, and, as the main body is inserted into the rail unit, pressure is released from the button to cause the rail fixing members to elastically return to initial positions.

3. The adapter device of claim 1, wherein the connector comprises:
    a coupling part including an insert member configured to be inserted into the coupling hole, and an operating handle that separates the insert member from the coupling hole;
    a connecting part connected to the coupling part configured to be rotatable as the coupling part is rotated, and extending to a predetermined length; and
    a holder fixing part coupled to the connecting part, and configured to allow angle adjustment and rotation of a holder for mounting the equipment.

4. The adapter device of claim 3, wherein the coupling part comprises:
    a ball member configured to protrude through a mounting guide hole formed in an outer circumference of the insert member; and
    a lift guide provided in the insert member and configured to be movable up and down by elasticity, connected to the operating handle, and moving downward as the operating handle is operated, thereby guiding the ball member into the guide hole.

5. The adapter device of claim 3, wherein the holder comprises a support member and pressing members for fixing the equipment.

6. The adapter device of claim 5, wherein the pressing members are formed such that a distance between the facing pressing members is adjustable to correspond to a size of the equipment.

7. The adapter device of claim 3, wherein the holder comprises:
    a seat member configured to support the equipment; and
    a receiving member positioned in a receiving hole provided in the seat member, and taken out from the receiving hole when the equipment is supported on the seat member, thereby elastically fixing the equipment.

8. An adapter device for a vehicle, the adapter device comprising:
    a rail unit installed in the vehicle and defining a moving path;
    an adapter unit mounted on the rail unit, the adapter unit being configured to move along the moving path, and a connector being configured to mount equipment to the adapter unit; wherein the adapter unit comprises:
    a main body having a coupling hole configured to receive the connector;
    a plurality of coupling guide rollers coupled to an upper surface of the main body, and configured to guide movement of the main body along the moving path while pressing and catching an outer circumference of a protrusion positioned in the rail unit; and
    a button configured to guide movement of any one of the coupling guide rollers, and to increase a distance between the facing coupling guide rollers, thereby releasing the coupling guide rollers from the protrusion and dismounting the main body from the rail unit.

9. The adapter device of claim 8, wherein, in a pressing state where a distance between the facing coupling guide rollers is larger than a width of the protrusion, pressure is released from the button, thereby pressing the protrusion and mounting the main body on the rail unit.

10. The adapter device of claim 8, wherein the protrusion comprises a light guide for coupling an indoor light.

\* \* \* \* \*